(12) United States Patent
Fukuhara et al.

(10) Patent No.: US 10,315,151 B2
(45) Date of Patent: Jun. 11, 2019

(54) EXHAUST TREATMENT APPARATUS AND CONTAINER APPARATUS

(71) Applicant: NGK INSULATORS, LTD., Nagoya (JP)

(72) Inventors: Motohiro Fukuhara, Nagoya (JP); Mikine Takeyama, Hashima-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 612 days.

(21) Appl. No.: 15/053,180

(22) Filed: Feb. 25, 2016

(65) Prior Publication Data

US 2016/0166971 A1    Jun. 16, 2016

Related U.S. Application Data

(63) Continuation of application No. PCT/JP2014/066834, filed on Jun. 25, 2014.

(30) Foreign Application Priority Data

Aug. 26, 2013  (JP) .................................. 2013-175069

(51) Int. Cl.
*B01D 53/02*    (2006.01)
*B01D 53/04*    (2006.01)
(Continued)

(52) U.S. Cl.
CPC ..... *B01D 53/0407* (2013.01); *B01D 46/0005* (2013.01); *B01D 46/0023* (2013.01);
(Continued)

(58) Field of Classification Search
CPC ............ B01D 2251/30; B01D 2253/10; B01D 2253/102; B01D 2253/104;
(Continued)

(56) References Cited

U.S. PATENT DOCUMENTS 3,804,942 A  *  4/1974  Kato ....................... A47L 9/122
                                                 422/122
5,141,706 A  *  8/1992  Clark ..................... A62B 11/00
                                                 422/122
(Continued)

FOREIGN PATENT DOCUMENTS

CN    200970370 Y    11/2007
JP    61-167422 A1    7/1986
(Continued)

OTHER PUBLICATIONS

International Search Report and Written Opinion (Application No. PCT/JP2014/066834) dated Aug. 19, 2014.
(Continued)

*Primary Examiner* — Christopher P Jones
(74) *Attorney, Agent, or Firm* — Burr & Brown, PLLC

(57) ABSTRACT

An exhaust treatment apparatus includes a casing having an inlet port for allowing an exhaust gas to flow into the casing and an outlet port for allowing a purified exhaust gas to be discharged from the casing, an exhaust fan provided in the casing for sending the exhaust gas from the inlet port to the outlet port, and chemical filters provided in two or more stages between the exhaust fan in the casing and the outlet port.

5 Claims, 10 Drawing Sheets

(51) Int. Cl.
  *H01M 2/10* (2006.01)
  *H01M 2/12* (2006.01)
  *H01M 10/42* (2006.01)
  *B01D 46/00* (2006.01)
(52) U.S. Cl.
  CPC ....... *H01M 2/1077* (2013.01); *H01M 2/1094* (2013.01); *H01M 2/12* (2013.01); *H01M 10/4207* (2013.01); *B01D 2251/30* (2013.01); *B01D 2253/10* (2013.01); *B01D 2253/102* (2013.01); *B01D 2253/104* (2013.01); *B01D 2257/106* (2013.01); *B01D 2257/2025* (2013.01); *B01D 2257/302* (2013.01); *B01D 2257/304* (2013.01); *B01D 2257/40* (2013.01); *B01D 2257/406* (2013.01); *B01D 2257/708* (2013.01); *B01D 2258/06* (2013.01); *H01M 2300/00* (2013.01)
(58) Field of Classification Search
  CPC ...... B01D 2257/106; B01D 2257/2025; B01D 2257/302; B01D 2257/304; B01D 2257/40; B01D 2257/406; B01D 2257/708; B01D 2258/06; B01D 46/0005; B01D 46/0023; B01D 53/0407; H01M 10/4207; H01M 2300/00; H01M 2/1077; H01M 2/1094; H01M 2/12
  See application file for complete search history.

(56) References Cited

U.S. PATENT DOCUMENTS

| | | | | |
|---|---|---|---|---|
| 5,685,895 A | * | 11/1997 | Hagiwara | .......... B01D 53/0407 96/117 |
| 5,902,182 A | * | 5/1999 | Kramer | ................... B01D 46/12 454/255 |
| 6,241,809 B1 | * | 6/2001 | Hopkins | ................ B01D 45/06 55/DIG. 36 |
| 6,840,987 B1 | * | 1/2005 | Gonzalez | ............. B01D 50/006 96/274 |
| 2004/0144104 A1 | | 7/2004 | Fuchs et al. | |
| 2005/0011356 A1 | | 1/2005 | Laiti | |
| 2005/0172816 A1 | * | 8/2005 | Son | .................... B01D 46/0013 96/417 |
| 2007/0062514 A1 | * | 3/2007 | Ota | ..................... A47J 37/0781 126/299 R |
| 2008/0092744 A1 | | 4/2008 | Storbo et al. | |
| 2012/0170009 A1 | * | 7/2012 | Katsura | ............. B01D 53/0415 355/30 |
| 2013/0298773 A1 | * | 11/2013 | Yamagishi | ............. B01D 46/10 96/15 |

FOREIGN PATENT DOCUMENTS

| | | |
|---|---|---|
| JP | 03-016535 U1 | 2/1991 |
| JP | 2003-265916 A1 | 9/2003 |
| JP | 2004-202392 A1 | 7/2004 |
| JP | 2009-018104 A1 | 1/2009 |
| JP | 2012-129138 A1 | 7/2012 |
| JP | 2013-099719 A1 | 5/2013 |
| WO | 2004/030767 A1 | 4/2004 |

OTHER PUBLICATIONS

Extended European Search Report (Application No. 14840413.0) dated Mar. 31, 2017.

Chinese Office Action (Application No. 201480047395.9) dated Oct. 28, 2016 (with English translation of pertinent portion).

* cited by examiner

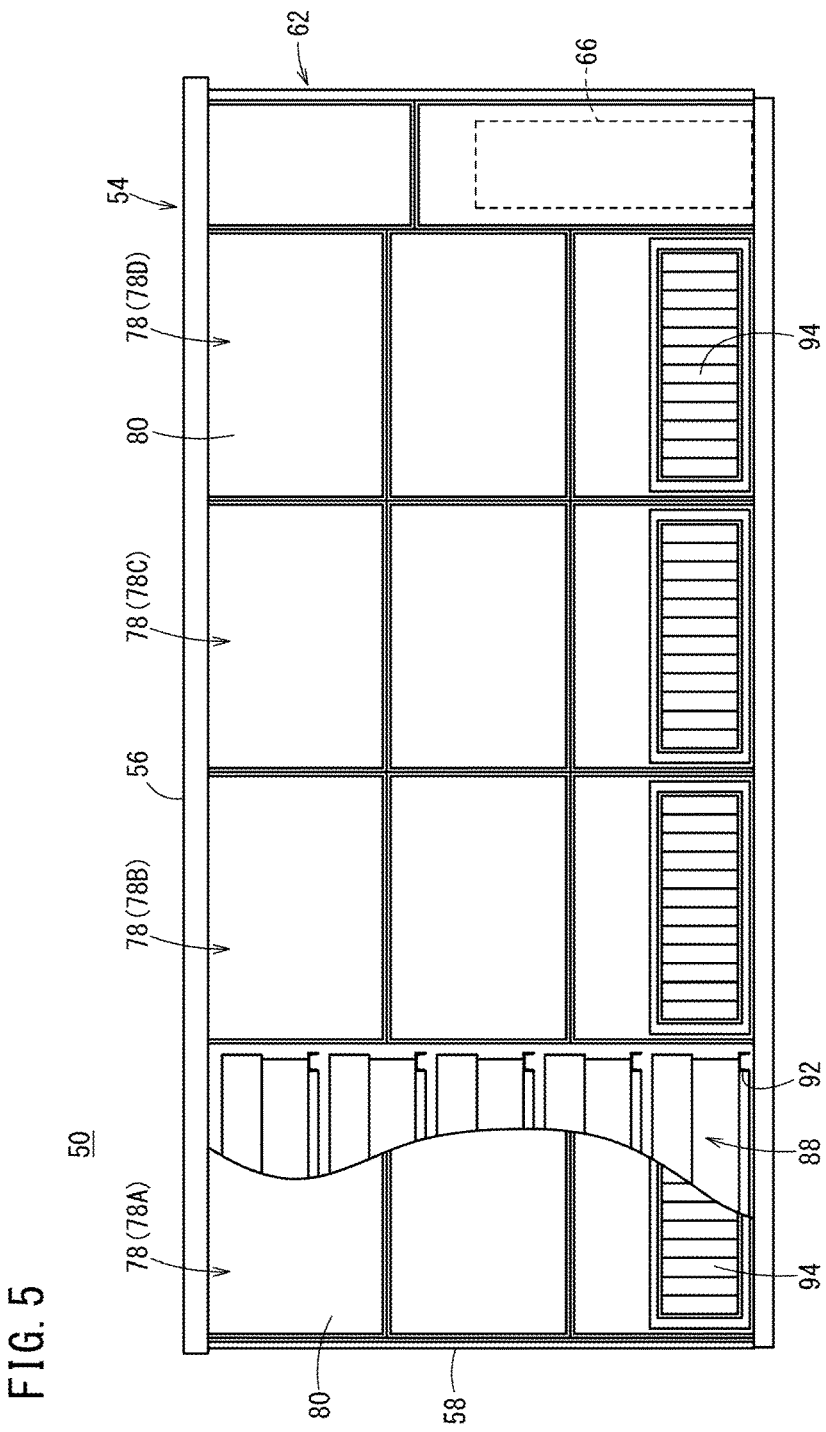

# EXHAUST TREATMENT APPARATUS AND CONTAINER APPARATUS

CROSS-REFERENCE TO RELATED APPLICATIONS

This application is a Continuation of International Application No. PCT/JP2014/066834 filed on Jun. 25, 2014, which was published under PCT Article 21(2) in Japanese, which is based upon and claims the benefit of priority from Japanese Patent Application No. 2013-175069 filed on Aug. 26, 2013, the contents all of which are incorporated herein by reference.

BACKGROUND OF THE INVENTION

Field of the Invention

The present invention relates to an exhaust treatment apparatus and a container apparatus for reducing concentration of harmful components from an exhaust gas produced in a fire, etc., and then discharging the exhaust gas.

Description of the Related Art

Conventionally, as treatments for detoxifying harmful gases, for example, a treatment method described in Japanese Laid-Open Patent Publication No. 2013-099719 and a system described in International Publication WO 2004/030767 have been proposed.

The above treatment method is a detoxifying treatment method for performing detoxifying treatment for harmful gases discharged in the process of producing semiconductors. In the detoxifying treatment, treatment liquid is brought into contact with treatment target gases containing a hydride gas introduced into a scrubber whereby the treatment target gases are detoxified. The alkali concentration of the treatment liquid is lowest at the gas inlet port at which the treatment target gases are introduced into the scrubber, and highest at the gas outlet port at which the treatment target gases are discharged from the scrubber.

The above system is a treatment system used for treatment of detoxifying harmful substances contained in fluid. This treatment system includes suction means for sucking fluid containing harmful substances, discharge means for discharging fluid sucked by the suction means, and harmful substance treatment means provided between the suction means and the discharge means, for treating harmful substances contained in the fluid sucked by the suction means. This harmful substance treatment means includes means for detoxifying harmful substances contained in the fluid sucked by the suction means.

SUMMARY OF THE INVENTION

However, in both of the treatment method described in Japanese Laid-Open Patent Publication No. 2013-099719 and the system described in International Publication WO 2004/030767 described above, harmful components are removed using liquid (fluid). Therefore, a flow channel for the liquid is required, and thus, the structure is complicated and has a large size disadvantageously. Further, since it is required to control or manage the liquid, substantial maintenance cost is required disadvantageously.

The present invention has been made taking the problems of this type into account, and an object of the present invention is to provide an exhaust treatment apparatus which does not require the use of liquid, which makes it possible to achieve size reduction, and which can be provided in combination with various apparatuses that discharge gas, while enabling ease of management and maintenance operations.

Further, an object of the present invention is to provide a container apparatus which makes it possible to remove harmful components from high concentration gas produced from a content (secondary battery, etc.) in a fire, etc., and discharge the gas after removal of the harmful components.

[1] An exhaust treatment apparatus according to a first aspect of the present invention includes a casing having an inlet port configured to allow an exhaust gas to flow into the casing and an outlet port configured to allow a purified exhaust gas to be discharged from the casing, an exhaust fan provided in the casing, for the exhaust fan being configured to send the exhaust gas from the inlet port to the outlet port, and a chemical filter provided in at least one stage between the exhaust fan in the casing and the outlet port.

The exhaust gas produced in a fire, etc. is sent from the inlet port to the outlet port by operation of the exhaust fan. The exhaust gas flows through the chemical filter between the inlet port and the outlet port. Consequently, the concentration of the target component contained in the exhaust gas is reduced, and the exhaust gas is purified. Consequently, the purified exhaust gas is discharged from the outlet port of the second chamber. Since no liquid is used, no flow channel for such liquid is required. Therefore, size reduction is achieved. The exhaust treatment apparatus can be provided easily in combination with various apparatuses that discharge gas, and management and maintenance operations can be carried out easily.

[2] In the first aspect, a pre-filter in at least one stage may be provided in the preceding stage of the chemical filter, the pre-filter having a pressure loss higher than that of the chemical filter.

In some cases, clogging may occur in the chemical filter due to dust, etc., produced by a fire, etc., and the purification performance of the chemical filter may be degraded. In order to address the problem, one or more pre-filters having the higher pressure loss in comparison with the chemical filter are provided in the preceding stage of the chemical filter. Owing thereto, dust, etc., can be collected by the pre-filter. Consequently, clogging in the chemical filter is suppressed, and thus, degradation of the purification performance of the chemical filter is suppressed.

[3] In this case, the pre-filter may be arranged in an oblique direction relative to the flow direction of the exhaust gas.

In the case where the pre-filter has, e.g., porous structure like non-woven fabric, the pre-filter is arranged in an oblique direction relative to the flow direction of the exhaust gas, whereby the surface area of contact between the exhaust gas and the pre-filter is increased, and the flow speed of the exhaust gas passing through the pre-filter is reduced. In this manner, it is possible to increase the effect of collecting dust, etc.

[4] In the first aspect, at least one first pre-filter may be provided in the preceding stage of the chemical filter, the first pre-filter having a pressure loss higher than that of the chemical filter, and a second pre-filter may be provided between the chemical filter and the first pre-filter, the second pre-filter having a pressure loss higher than that of the chemical filter and lower than that of the first pre-filter.

The first pre-filter is provided in the preceding stage of the chemical filter. Therefore, dust, etc. can be collected by the pre-filter. Consequently, clogging in the chemical filter is suppressed, and thus, degradation of the purification performance of the chemical filter is suppressed.

Even in the case where the chemical filters are provided in multiple stages, depending on the structure of the chemical filter, the flow of the exhaust gas is aligned, and turbulence of the flow of the exhaust gas does not occur easily at the surfaces of the chemical filters in the second stage and the subsequent stages. In such a case, the target component is reduced effectively (removal rate of the target component is high) in the chemical filter in the first stage. However, in some cases, the effect of reducing the target component is hardly obtained in the second stage and the subsequent stages.

In order to address the problem, the second pre-filter is provided in the inlet side (preceding stage) of each chemical filter. In the structure, since the flow of the exhaust gas is disturbed by the second pre-filter, turbulent flow of the exhaust gas is generated easily at the surfaces of the chemical filters. Consequently, even in the case where the chemical filters are provided in multiple stages, the effect of reducing the target component (effect of removing the target component) in each chemical filter is obtained at a certain level or more.

[5] In the first aspect, the chemical filter may include chemical filters in two or more stages, and among the chemical filters, adjacent chemical filters may be provided in different orientations.

By arranging the adjacent chemical filters in different orientations, turbulence is caused in the flow of the exhaust gas, and the exhaust gas can be agitated. Consequently, the effect of reducing the target component (effect of removing the target component) in each chemical filter is obtained at a certain level or more.

[6] In the first aspect, the casing may include a first chamber having the inlet port, a second chamber having the outlet port, and a partition plate as a partition between the first chamber and the second chamber. The partition plate may have a communication hole configured to communicate the first chamber with the second chamber. The exhaust fan may send the exhaust gas from the inlet port of the first chamber to the second chamber through the communication hole.

The exhaust gas produced in a fire, etc. is sent from the inlet port to the second chamber through the communication hole by operation of the exhaust fan. After the exhaust gas is sent to the second chamber, the exhaust gas flows through the chemical filter provided in the second chamber. Consequently, the concentration of the target component in the exhaust gas is reduced. As a result, the purified exhaust gas is discharged from the outlet port of the second chamber.

[7] In this case, the inlet port may be provided at a lower position of the first chamber, the outlet port may be provided at a lower position of the second chamber, and the communication hole may be provided at an upper position of the partition plate.

Therefore, the flow path of the exhaust gas can be formed vertically in a serpentine pattern, and the installation area required for providing the casing can be reduced. That is, it is possible to realize the size reduction of the exhaust treatment apparatus. Consequently, the exhaust treatment apparatus can be provided in combination with a building or container apparatus (e.g., container apparatus of secondary batteries) where high concentration gas is produced in a fire, etc.

[8] Further, the exhaust fan may be provided at an upper position of the first chamber. The exhaust gas can be sent efficiently from the inlet port provided at the lower position of the first chamber to the second chamber through the communication hole provided at the upper position of the partition plate.

[9] A container apparatus according to a second aspect of the present invention includes a package having a container space surrounded by at least a roof, a front plate, and a side plate, and a content housed in the container space of the package. The container apparatus further has an intake port and an exhaust port provided in the package, a shutter mechanism configured to close the intake port and the exhaust port when an abnormality occurs in the content and thereby confine the exhaust gas, and an exhaust treatment apparatus provided in combination with the package. The exhaust treatment apparatus includes a casing having an inlet port configured to allow an exhaust gas to flow into the casing and an outlet port configured to allow a purified exhaust gas to be discharged from the casing, an exhaust fan provided in the casing, for the exhaust fan being configured to send the exhaust gas from the inlet port to the outlet port, and chemical filters provided in two or more stages between the exhaust fan in the casing and the outlet port.

Since the gas intake port and the gas discharge port of the package are closed, the exhaust gas containing the high concentration target component produced in a fire, etc. of the content housed in the package does not leak to the outside. However, since the package is filled with high concentration exhaust gas due to occurrence of an accident, if the package is opened at the time of handling the accident after occurrence of the accident, the handling thereof cannot be performed smoothly due to the high concentration exhaust gas. Therefore, it is required to additionally provide a scrubber for thereby performing exhaust treatment. However, such a scrubber needs to be installed in place, and the exhaust treatment by the scrubber is time consuming.

The container apparatus according to the second aspect of the present invention is equipped with the exhaust treatment apparatus. Therefore, the exhaust gas produced in a fire, etc. of the content housed in the package is sent from the inlet port to the outlet port by operation of the exhaust fan of the exhaust treatment apparatus. Since the exhaust gas flows through the chemical filter between the inlet port and the outlet port, concentration of the target component is reduced. Consequently, the purified exhaust gas is discharged from the outlet port of the second chamber. Therefore, the accident can be handled promptly. Further, since no liquid is used, no flow channel for such liquid is required. Accordingly, size reduction of the container apparatus having the exhaust treatment apparatus provided in combination with the package is achieved, and management and maintenance operations can be carried out easily.

As described above, in the exhaust treatment apparatus according to the first aspect of the present invention, it is not required to use liquid. Size reduction is achieved, and the exhaust treatment apparatus can be provided easily in combination with various apparatuses that discharge gas. The management and maintenance operations can be carried out easily.

Further, in the container apparatus according to the second aspect of the present invention, even if high concentration gas is produced from the content (secondary batteries, etc.) due to a fire or the like, it is possible to remove harmful components from the high concentration gas, and then discharge the gas from which the harmful components have been removed.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a front view showing a container apparatus according to an embodiment of the present invention;

DESCRIPTION OF THE PREFERRED EMBODIMENTS

Hereinafter, embodiments of an exhaust treatment apparatus and a container apparatus according to the present invention will be described with reference to FIGS. 1A to 10.

Figure 1A:
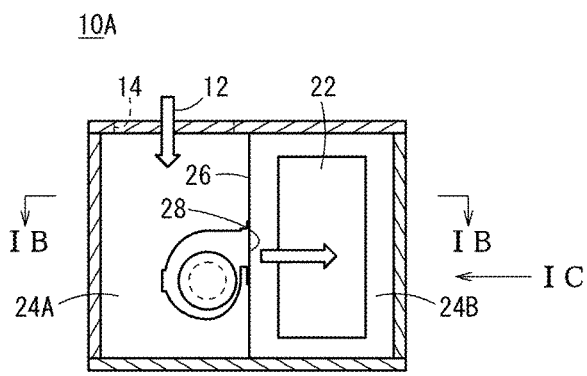
FIG. 1A is a transverse cross sectional view showing an exhaust treatment apparatus (first exhaust treatment apparatus) according to a first embodiment of the present invention.
Figure 1B:
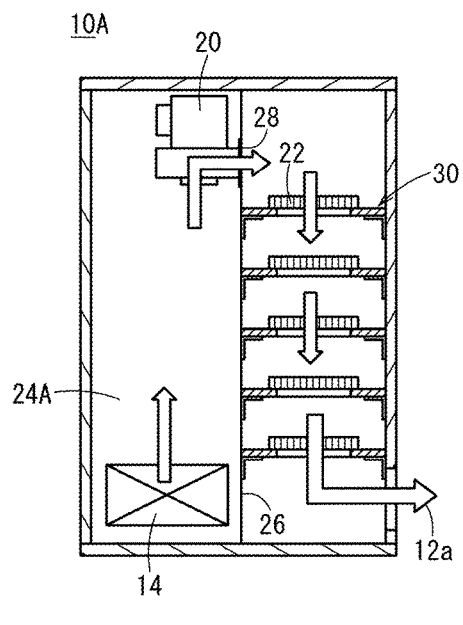
FIG. 1B is a cross sectional view taken along a line IB-IB in FIG. 1A.
Figure 1C:
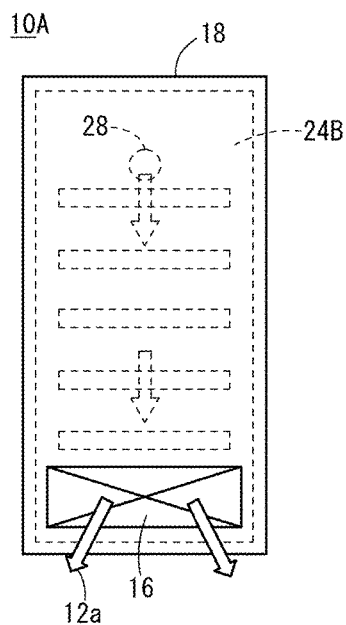
FIG. 1C is an arrow view as viewed in a direction of an arrow IC in FIG. 1A.

Firstly, as shown in FIGS. 1A to 1C, an exhaust treatment apparatus according to a first embodiment (hereinafter referred to as a first exhaust treatment apparatus 10A) includes a casing 18 having an inlet port 14 for allowing an exhaust gas 12 to flow into the casing 18 and an outlet port 16 for allowing a purified exhaust gas 12a to be discharged from the casing 18, an exhaust fan 20 provided in the casing 18 for sending the exhaust gas 12 from the inlet port 14 to the outlet port 16, and a chemical filter 22 provided in at least one stage between the exhaust fan 20 in the casing 18 and the outlet port 16. In an example of FIG. 1A to 1C, five chemical filters 22 are provided.

Specifically, the casing 18 has a rectangular parallelepiped outer shape, for example. The casing 18 includes a first chamber 24A having the inlet port 14, a second chamber 24B having the outlet port 16, and a partition plate 26 as a partition between the first chamber 24A and the second chamber 24B. The partition plate 26 has a communication hole 28 for communicating the first chamber 24A with the second chamber 24B. The inlet port 14 is provided at a lower position of the first chamber 24A, and the outlet port 16 is provided at a lower position of the second chamber 24B. The communication hole 28 is provided at an upper position of the partition plate 26. An exhaust fan 20 is provided at an upper position of the first chamber 24A, and sends the exhaust gas 12 from the inlet port 14 of the first chamber 24A to the second chamber 24B through the communication hole 28.

The chemical filters 22 are provided in the second chamber 24B, and the second chamber 24B has support members 30 for supporting the chemical filters 22. Any member can be used as the support member 30 as long as it does not obstruct the downward flow of the exhaust gas 12 passing through the chemical filter 22. For example, a frame body or a grid plate fixed to a rack frame provided on an inner wall of the second chamber 24B may be used as the support member 30. It is a matter of course that the rack frame itself may be used as the support member 30. It should be noted that illustration of the support member is omitted in FIGS. 1A and 1C. Illustration of the support member is omitted in FIGS. 2A, 2C, 3A, 3C, 4A, and 4C as well.

For example, each of the chemical filters 22 is a molded structure having grid structure (including honeycomb structure) made of porous absorbing material, or a structure where porous granular absorbing material is supported on a porous structural component such as nonwoven fabric. This chemical filter 22 uses activated carbon or aluminum oxide as base material, and is formed by molding the base material while mixing with phosphoric acid, potassium carbonate, sodium thiosulfate, sodium permanganate, sulfur, etc. appropriately in correspondence with the target component removed from the exhaust gas 12 (i.e., target component to be absorbed). The target component includes formaldehyde, VOCs (volatile organic compounds), ozone, hydrogen sulfide, sulfur dioxide, chlorine, ammonia, amine, etc.

Next, operation of the first exhaust treatment apparatus 10A will be described. The exhaust gas 12 produced in a fire, etc. is sent from the inlet port 14 to the second chamber 24B through the communication hole 28 by operation of the exhaust fan 20. After the exhaust gas 12 is sent to the second chamber 24B, the exhaust gas 12 flows through the chemical filters 22 provided in the second chamber 24B. Consequently, the target component contained in the exhaust gas 12 is gradually removed, and the concentration of the target component in the exhaust gas 12 is reduced, and the exhaust gas 12 is purified. As a result, the purified exhaust gas 12a is discharged from the outlet port 16 of the second chamber 24B. Since no liquid is used, no flow channel for such liquid is required. Therefore, size reduction is achieved, and the first exhaust treatment apparatus 10A can be provided easily in combination with various apparatuses which discharge gas, and management and maintenance operations can be carried out easily. It should be noted that the flow speed of the exhaust gas 12 passing through at least the chemical filters 22 by operation of the exhaust fan 20 is in a range of 0.1 to 1.5 m/sec.

In particular, since the inlet port 14 is provided at the lower position of the first chamber 24A, the outlet port 16 is provided at the lower position of the second chamber 24B, and the communication hole 28 is provided at the upper position of the partition plate 26, the flow path of the exhaust gas 12 can be formed vertically in a serpentine pattern, and the size of the installation area required for providing the casing 18 can be reduced. That is, at is possible to realize size reduction of the exhaust treatment apparatus 10. Consequently, the exhaust treatment apparatus 10 can be provided in combination with a building, a container apparatus (e.g., container apparatus of secondary batteries) or the like where high concentration gas is produced in a fire, etc.

Further, since the exhaust fan 20 is provided at the upper position of the first chamber 24A, the exhaust gas 12 can be sent to the second chamber 24B efficiently from the inlet port 14 provided at the lower position of the first chamber 24A through the communication hole 28 provided at the upper position of the partition plate 26.

Next, an exhaust treatment apparatus according to a second embodiment of the present invention (hereinafter referred to as a second exhaust treatment apparatus 10B) will be described with reference to FIGS. 2A to 2C.

Figure 2A:
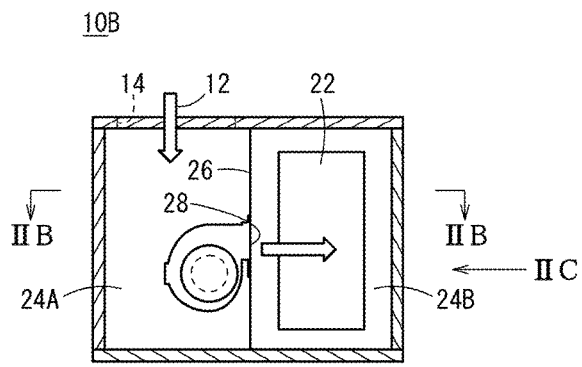
FIG. 2A is a transverse cross sectional view showing an exhaust treatment apparatus (second exhaust treatment apparatus) according to a second embodiment of the present invention.
Figure 2B:
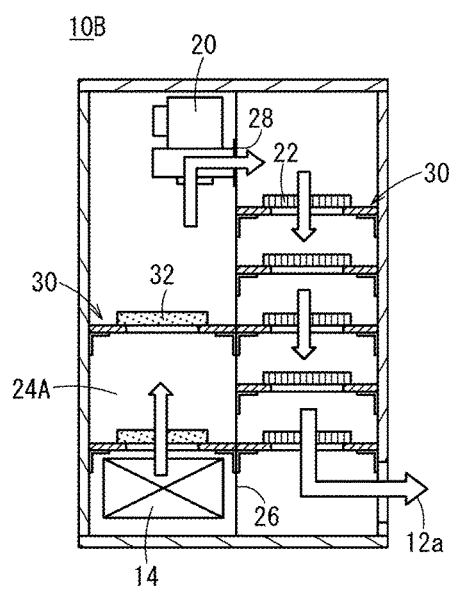
FIG. 2B is a cross sectional view taken along a line IIB-IIB in FIG. 2A.
Figure 2C:
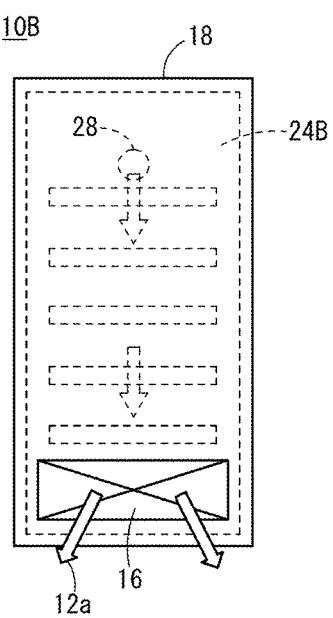
FIG. 2C is an arrow view as viewed in a direction of an arrow IIC in FIG. 2A.

As shown in FIGS. 2A to 2C, the second exhaust treatment apparatus 10B has substantially the same structure as the above described first exhaust treatment apparatus 10A, while the second exhaust treatment apparatus 10B is different from the first exhaust treatment apparatus 10A in that one or more pre-filters 32 having a pressure loss higher than that of the chemical filters 22 are provided in the preceding stage of the chemical filters 22. Specifically, for example, two pre-filters 32 are provided between the inlet port 14 and the exhaust fan 20 of the first chamber 24A. In the structure, the support members 30 for supporting the pre-filters 32 are provided also in the first chamber 24A. As these support members 30, for example, the same members as the above described support members 30 supporting the chemical filters 22 may be used. In FIG. 2A, illustration of the pre-filters 32 is omitted.

In some cases, clogging occurs in the chemical filters 22 due to dust, etc., produced by a fire, etc., and the purification performance of the chemical filter 22 may be degraded. In the second exhaust treatment apparatus 10B, since one or more pre-filters 32 having the higher pressure loss in comparison with the chemical filters 22 are provided in the preceding stage of the chemical filters 22, dust, etc., can be collected by the pre-filter 32. Consequently, clogging in the chemical filters 22 is suppressed, and thus, degradation of the purification performance of the chemical filters 22 is suppressed.

Next, an exhaust treatment apparatus according to a third embodiment of the present invention (hereinafter referred to as a third exhaust treatment apparatus 10C) will be described with reference to FIGS. 3A to 3C.

Figure 3A:
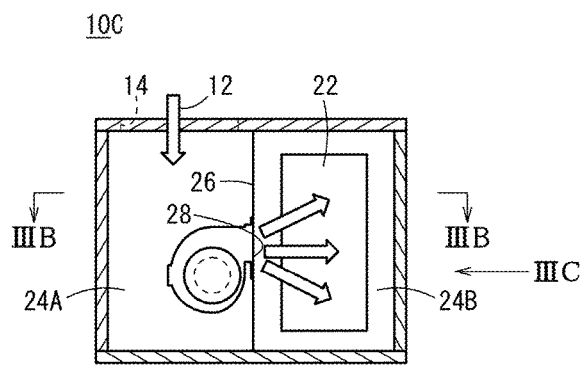
FIG. 3A is a transverse cross sectional view showing an exhaust treatment apparatus (third exhaust treatment apparatus) according to a third embodiment of the present invention.
Figure 3B:
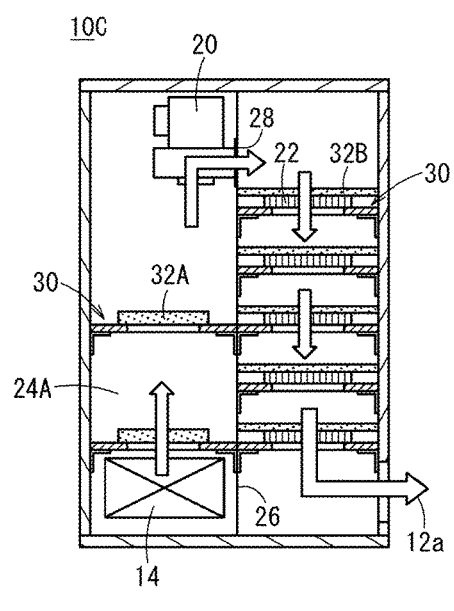
FIG. 3B is a cross sectional view taken along a line IIIB-IIIB in FIG. 3A.
Figure 3C:
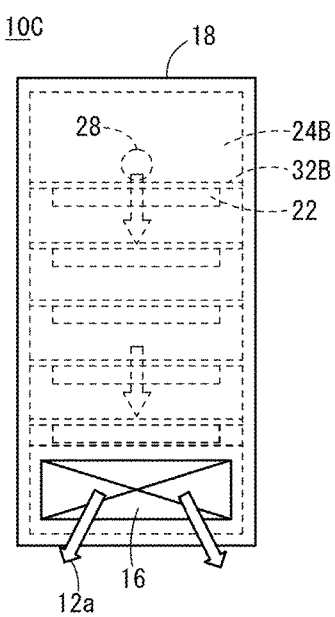
FIG. 3C is an arrow view as viewed in a direction of an arrow IIIC in FIG. 3A.

As shown in FIGS. 3A to 3C, the third exhaust treatment apparatus 10C has substantially the same structure as the second exhaust treatment apparatus 10B as described above, while the third exhaust treatment apparatus 10C is different from the second exhaust treatment apparatus 10B in that the third exhaust treatment apparatus 10C has a first pre-filter 32A and a second pre-filter 32B. The second pre-filter 32B is a filter intended to disturb the flow of the exhaust gas, and has porous structure, for example. It is a matter of course that the second pre-filter 32B may be used to collect dust, etc. In FIG. 3A, illustration of the first pre-filter 32A and the second pre-filter 32B is omitted.

Specifically, one or more first pre-filters 32A having a pressure loss higher than that of the chemical filters 22 are provided in the preceding stage of the chemical filters 22. Further, a second pre-filter 32B having a pressure loss higher than that of the chemical filters 22 and lower than that of the first pre-filter 32A is provided between the chemical filters 22 and the first pre-filter 32A. As for installation of the second pre-filter 32B, as shown in FIGS. 3B and 3C, preferably, the second pre-filter 32B may be provided (or placed) on the surface of each of the chemical filters 22.

In this regard, the range of pressure loss of each of the chemical filter 22, the first pre-filter 32A and the second pre-filter 32B is shown in the following table 1. This table shows the range of the pressure loss in the case where the flow speed is 1.5 m/sec.

TABLE 1

| | Pressure Loss (In the case of flow speed of 1.5 m/sec) |
|---|---|
| Chemical Filter | 30 to 20 Pa |
| First Pre-Filter | 150 to 30 Pa |
| Second Pre-Filter | 25 to 15 Pa |

In the third exhaust treatment apparatus 10C, the first pre-filter 32A is provided in the preceding stage of the chemical filters 22. Therefore, as in the case of the second exhaust treatment apparatus 10B, since dust, etc. collected by the first pre-filter 32A, clogging of the chemical filters 22 is suppressed, and thus, degradation of the purification performance of the chemical filters 22 is suppressed.

Even in the case where the chemical filters 22 are provided in multiple stages, depending on the structure of the chemical filters 22, the flow of the exhaust gas 12 is aligned, and turbulence of the flow of the exhaust gas 12 does not occur easily at the surfaces of the chemical filters 22 in the second stage and the subsequent stages. This often occurs particularly in the case where a porous body having gird structure or honeycomb structure is used. In such a case, the target component is reduced effectively (removal rate of the target component is high) in the chemical filter 22 in the first stage (uppermost stage). However, in some cases, the chemical filters in the second stage and the subsequent stages hardly produce the reduction effect of the target component.

In order to address the problem, in the third exhaust treatment apparatus 10C, the second pre-filter 32B is provided between the chemical filters 22 and the first pre-filter 32A. Specifically, the second pre-filter 32B is provided on the surface of each of the chemical filters 22. In the structure, since the flow of the exhaust gas 12 is disturbed by the second pre-filter 32B, turbulent flow of the exhaust gas 12 is generated easily at the surface of the chemical filter 22. Consequently, even in the case where the chemical filters 22 are provided in multiple stages, the effect of reducing concentration of the target component (effect of removing the target component) in each chemical filter 22 is obtained at a certain level or more. Further, since the pressure loss of the second pre-filter 32B is lower than that of the first pre-filter 32A, it is possible to prevent the excessive increase in the resistance.

Next, an exhaust treatment apparatus according to a fourth embodiment of the present invention (hereinafter referred to as a fourth exhaust treatment apparatus 10D) will be described with reference to FIGS. 4A to 4C.

Figure 4A:
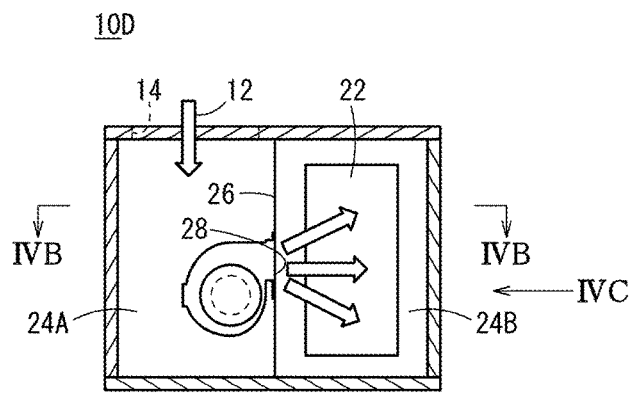
FIG. 4A is a transverse cross sectional view showing an exhaust treatment apparatus (fourth exhaust treatment apparatus) according to a fourth embodiment of the present invention.
Figure 4B:
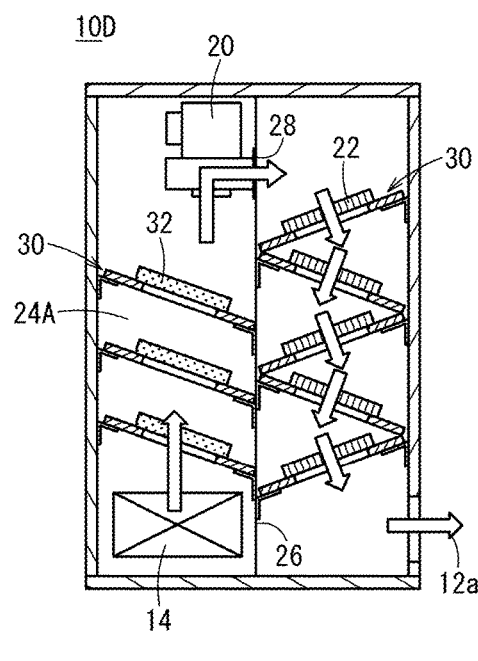
FIG. 4B is a cross sectional view taken along a line IVB-IVB in FIG. 4A.
Figure 4C:
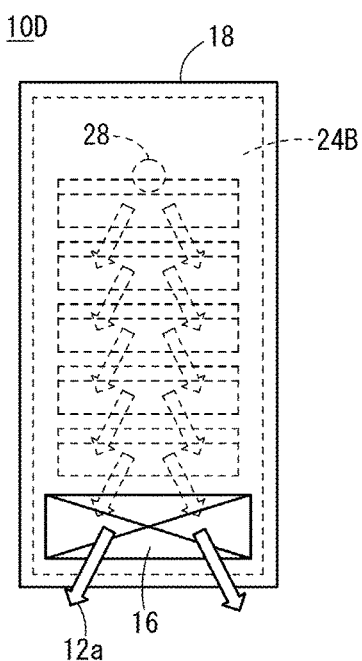
FIG. 4C is an arrow view as viewed in a direction of an arrow IVC in FIG. 4A.

As shown in FIGS. 4A to 4C, the fourth exhaust treatment apparatus 10D has substantially the same structure as the above-described second exhaust treatment apparatus 10B. However, the fourth exhaust treatment apparatus 10D is different from the above described second exhaust treatment apparatus 10B in the following point.

In the above described second exhaust treatment apparatus 10B, two pre-filters 32 are arranged in a horizontal posture. In contrast, in this fourth exhaust treatment apparatus 10D, three pre-filters 32 are arranged in an oblique posture, such that the surfaces of the pre-filters 32 are oriented, e.g., toward the second chamber 24B. Specifically, the pre-filters 32 are arranged obliquely relative to the flow direction of the exhaust gas 12. The pre-filters 32 are installed at an inclined angle in a range of 10° to 60° relative to the horizontal direction. In the structure, the surface areas of the pre-filters 32 can be increased about twice at most in comparison to the case of the horizontally-arranged pre-filters. In FIG. 4B, the pre-filter 32 are inclined at an angle of 25° so as to increase the surface areas of the pre-filters 32 to 1.1 times of those of the horizontally-arranged pre-filters.

Further, in the fourth exhaust treatment apparatus 10D, the adjacent chemical filters 22 are provided in different orientations. Specifically, the chemical filters 22 in the first stage, third stage, and fifth stage from the top are arranged in an oblique posture such that the surfaces of the chemical filters 22 are orientated toward the first chamber 24A, for example. The chemical filters 22 in the second stage and the fourth stage are arranged in an oblique posture such that the surfaces of the chemical filters 22 are orientated in a direction opposite to the first chamber 24A. Also in this case, the chemical filters 22 are installed at an inclined angle in a range of 5° to 50°, preferably, in a range of 10° to 30° relative to the horizontal direction. In FIG. 4B, the chemical filters 22 are inclined at an angle of 25°.

In this fourth exhaust treatment apparatus 100, firstly, the pre-filter 32 is oriented in an oblique direction relative to the flow direction of the exhaust gas 12. Therefore, in the case where the pre-filter 32 has, e.g., porous structure like nonwoven fabric, the surface area of the contact between the exhaust gas 12 and the pre-filter 32 is increased, so that the effect of collecting dust, etc. is increased.

Further, since the adjacent chemical filters 22 are provided in different orientations, turbulence is caused in the flow of the exhaust gas 12, and the exhaust gas 12 can be agitated. Consequently, the effect of reducing concentration of the target component (effect of removing the target component) in each chemical filter 22 is obtained at a certain level or more.

In particular, the chemical filters 22 in the first stage, third stage, and fifth stage from the top are arranged in an oblique direction such that the surfaces of the chemical filters 22 are oriented toward the first chambers 24A, whereas the chemical filters 22 in the second and fourth stage are arranged in an oblique direction such that the surfaces of the chemical filters 22 are oriented in a direction opposite to the first chamber 24A. In this case, by making each of the chemical filters 22 to have a grid structure or a honeycomb structure, the exhaust gas 12 can be caused to flow in a zigzag pattern. With the simple structure, it is possible to agitate the exhaust gas 12. It is not required to additionally provide an apparatus for agitating the exhaust gas 12.

Next, one experimental example will be shown. In this experimental example, as the exhaust gas 12, $SO_2$ gas was used. The removal rate of $SO_2$ (target component) was checked for each of the first exhaust treatment apparatus 10A, the third exhaust treatment apparatus 10C, and the fourth exhaust treatment apparatus 10D. Specifically, assuming that $SO_2$ concentration before the exhaust gas 12 passes through the chemical filters 22 is a reference concentration, the ratio of the $SO_2$ concentration after the exhaust gas passes through each of the chemical filters 22 to the reference concentration and the overall removal rate of the target component were checked. The result is shown in the following table 2.

TABLE 2

| | Ratio To Reference Concentration | | | | | | |
|---|---|---|---|---|---|---|---|
| | Reference Concentration | After 1st Stage Filter | After 2nd Stage Filter | After 3rd Stage Filter | After 4th Stage Filter | After 5th Stage Filter | Overall Removal Rate |
| First Exhaust Treatment Apparatus | 100% | 45% | 42% | 43% | 44% | 37% | 63% |
| Third Exhaust Treatment Apparatus | 100% | 56% | 29% | 8% | 4% | 1% | 99% |
| Fourth Exhaust Treatment Apparatus | 100% | 72% | 53% | 46% | 37% | 25% | 75% |

As can be seen from the table 2, even in the first exhaust treatment apparatus 10A, the removal rate of 60% or more is achieved, and thus, the first exhaust treatment apparatus 10A can be used in practical applications. Further, in the third exhaust treatment apparatus 10C and the fourth exhaust treatment apparatus 10D using the pre-filters, the removal rate of 75% or more is achieved, and thus, the third exhaust treatment apparatus 10C and the fourth exhaust treatment apparatus 10D have the excellent performance of purifying the exhaust gas 12. In particular, in the third exhaust treatment apparatus 10C using two types of pre-filters (first pre-filter 32A and second pre-filter 32B), the removal rate of 99% is achieved, and thus, the third exhaust treatment apparatus 10C is very excellent.

Next, a container apparatus 50 according to an embodiment of the present invention will be described with reference to FIGS. 5 to 10. It should be noted that the first exhaust treatment apparatus 10A to the fourth exhaust treatment apparatus 10D may be collectively referred to as the exhaust treatment apparatus 10.

Figure 6:
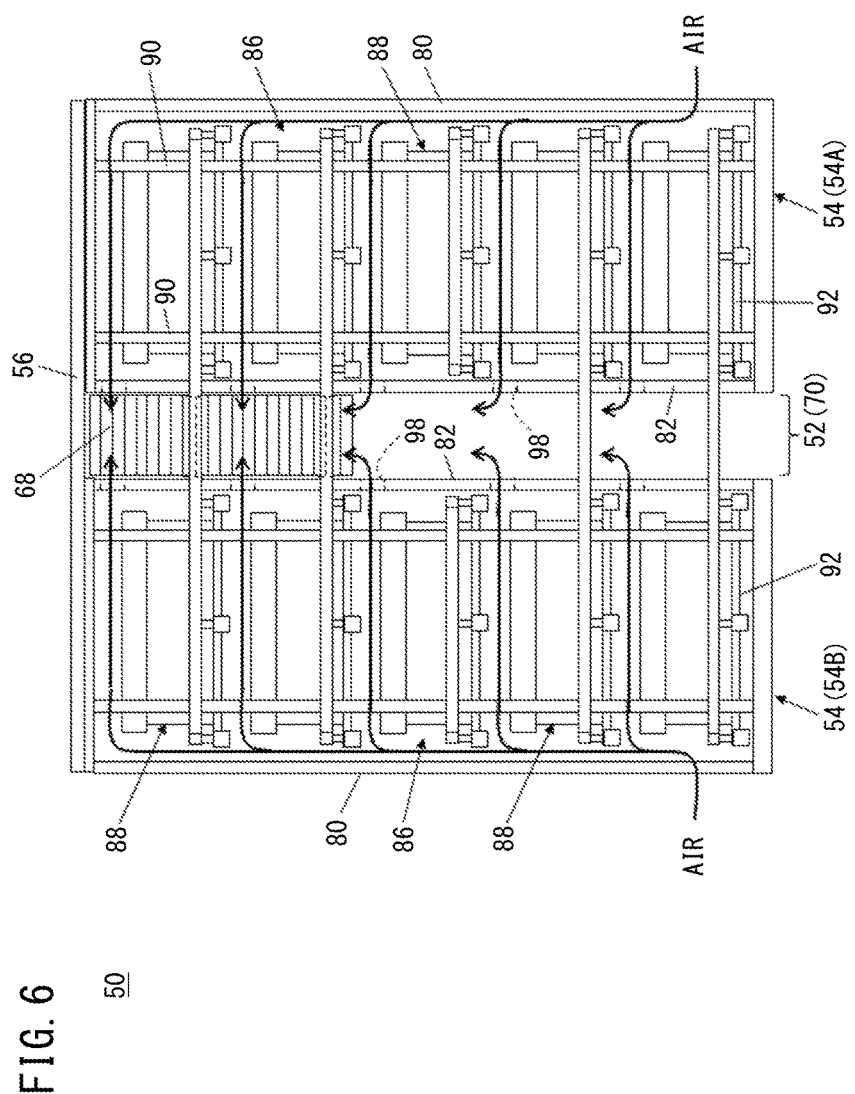
FIG. 6 is a side view showing the container apparatus in a state where a side closing plate is detached from the container apparatus.
Figure 7:
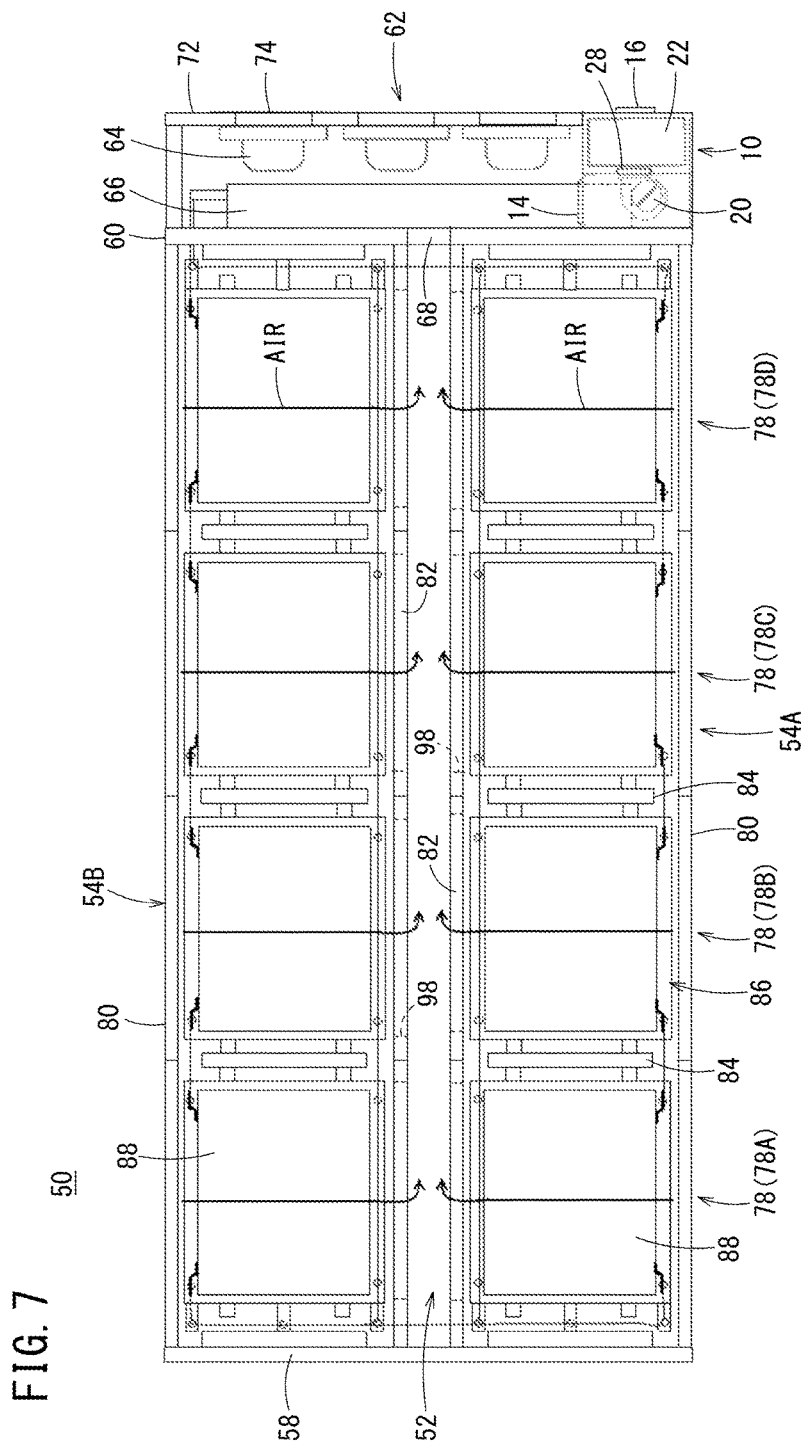
FIG. 7 is a plan view showing the container apparatus in a state where a roof is detached from the container apparatus.

As shown in FIGS. 5 to 7, the container apparatus 50 includes, e.g., two packages 54 (first package 54A and second package 54B) provided so as to face each other across a gap 52 (see FIGS. 6 and 7), a roof 56 covering the entire area above the first package 54A, the second package 54B, and the gap 52, a side closing plate 58 covering the entire area on one side of the first package 54A, the second package 54B, and the gap 52, a partition plate 60 covering the entire area on the other side of the first package 54A, the second package 54B, and the gap 52, and a control chamber 62 provided adjacent to the partition plate 60.

An exhaust apparatus 64 is provided at an upper position of the control chamber 62, and a control device 66 is provided at a lower position of the control chamber 62. A communication hole 68 (see FIGS. 6 and 7) communicating with the exhaust apparatus 64 is formed at an upper position of the partition plate 60 corresponding to the gap 52. That is, the gap 52 which is present between the first package 54A and the second package 54B forms an exhaust gas channel 70 for the air moved by the exhaust apparatus 64.

As shown in FIG. 7, an exhaust port 74 is formed in a side plate 72 of the control chamber 62 at a position facing the exhaust apparatus 64. The exhaust port 74 has a wind pressure type shutter 76 (see FIG. 9). Along with operation of the exhaust apparatus 64, the wind pressure type shutter 76 is opened, and the exhaust port 74 is placed in the open state. When operation of the exhaust apparatus 64 is stopped, the wind pressure type shutter 76 is closed, and the exhaust port 74 is placed in the closed state.

Each of the first package 54A and the second package 54B has a plurality of (e.g., four) casings 78 (first casing 78A to fourth casing 78D). Each of the casings 78 has a container space 86 surrounded by at least a front plate 80, a rear plate 82, and a side plate 84. In the container space 86, a plurality of (e.g., five) module batteries 88 (containers) are stacked in stages.

The casing 78 has four support columns 90 (see FIG. 6) in the container space 86. For example, on these support columns 90, frames 92 are mounted in parallel at equal intervals. One module battery 88 is placed on and fixed to each of the frames 92.

Further, as shown in FIG. 5, an intake port 94 is provided only at a lower position of the front plate 80. The intake port 94 is provided in the front plate 80, at a position facing the module battery 88 in the first stage. An intake port opening/closing unit 96 (see FIG. 10) is provided in correspondence with each of the intake ports 94. Each of the intake port opening/closing units 96 opens/closes the corresponding intake port 94 based on an opening signal and a closing signal from the control device 66.

Figure 8A:
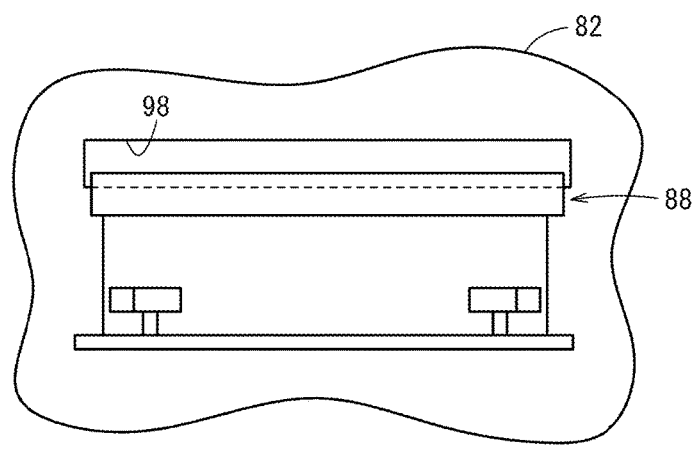
FIG. 8A is a front view showing the positional relationship between a module battery and an opening of a rear panel with partial omission.
Figure 8B:
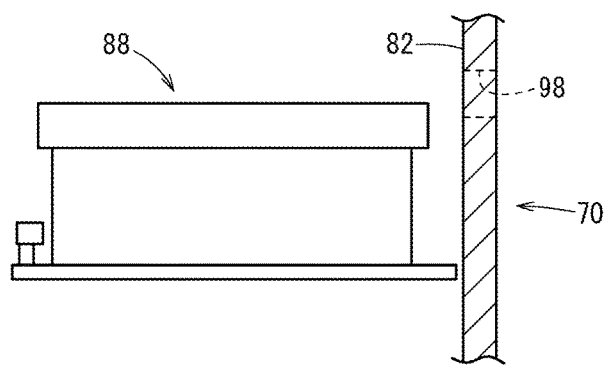
FIG. 8B is a side view thereof.

Further, as shown in FIGS. 8A and 8B typically, in the rear plate 82, an opening 98 communicating with the exhaust gas channel 70 is provided at a position corresponding to the module battery 88. For example, the opening shape of the opening 98 is a rectangular shape or an elliptical shape.

Figure 9:
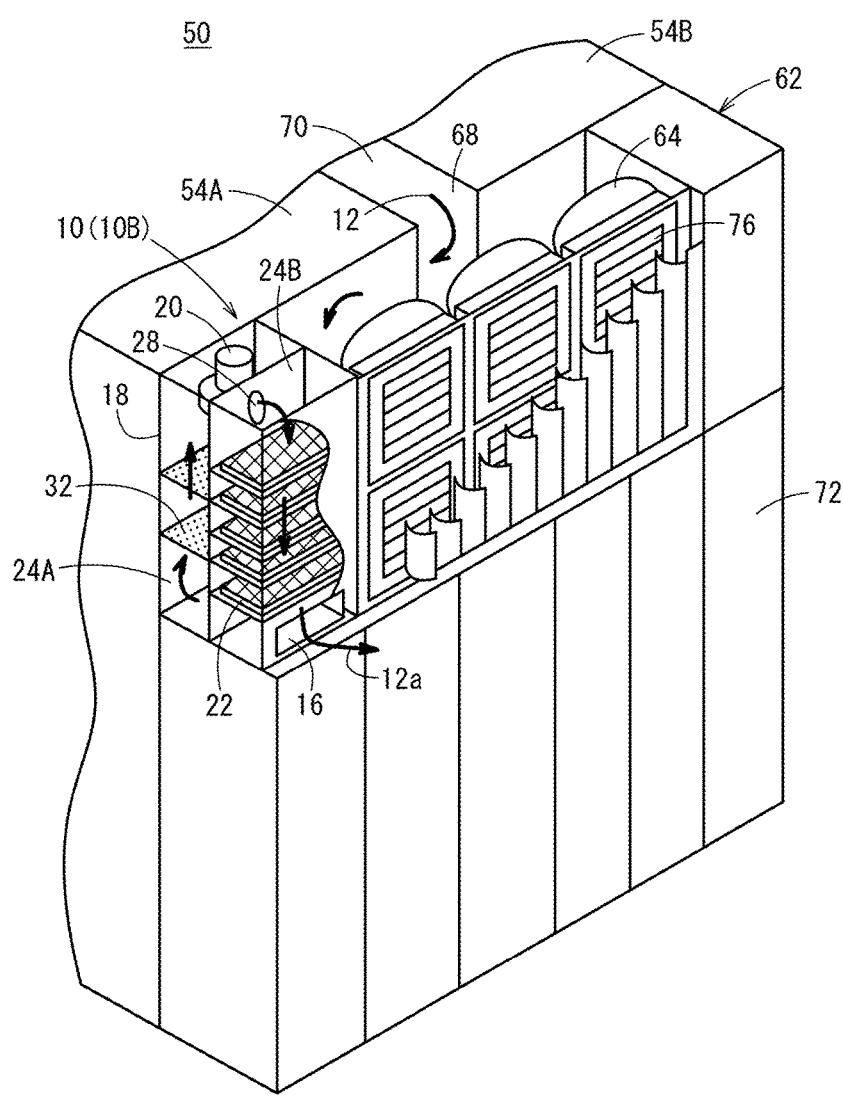
FIG. 9 is a perspective view showing structure of a control chamber in the container apparatus according to the embodiment of the present invention with partial breakaway.

Further, as shown in FIG. 9 (and FIG. 7), the above described exhaust treatment apparatus 10 is provided adjacent to a corner at an upper position of the control chamber 62. In FIG. 9, by way of example, the second exhaust treatment apparatus 10B is provided adjacent to the corner. It is a matter of course that the first exhaust treatment apparatus 10A, the third exhaust treatment apparatus 10C, or the fourth exhaust treatment apparatus 10D, instead of the second exhaust treatment apparatus 10B, may be provided adjacent to the corner.

In this case, in the casing 18 of the exhaust treatment apparatus 10, the first chamber 24A is provided adjacent to the first package 54A, and the inlet port 14 (not shown in FIG. 9, see FIG. 7) is provided inside the control chamber 62. Further, the outlet port 16 is exposed to the outside.

Figure 10:
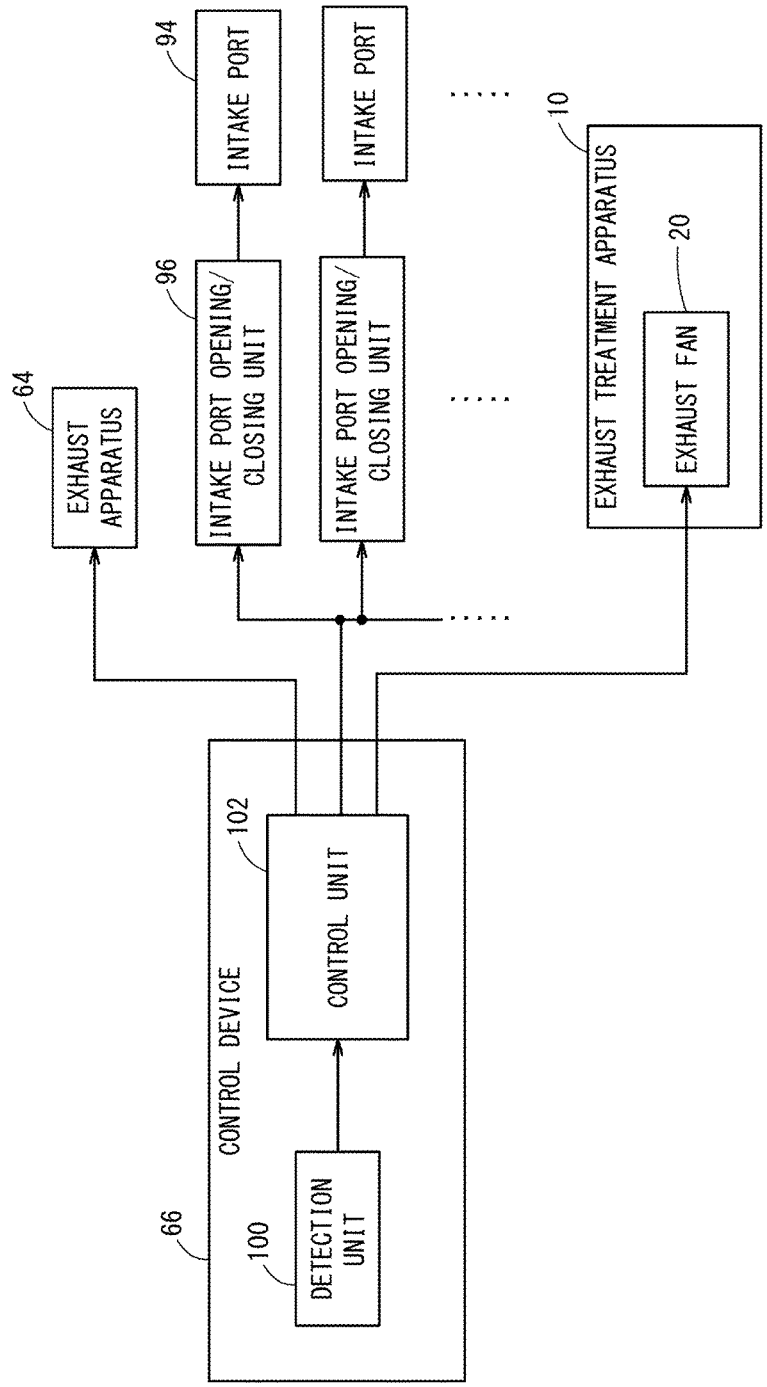
FIG. 10 is a block diagram showing functions of a control device.

As shown in FIG. 10, the control device 66 provided at the lower position of the control chamber 62 includes a detection unit 100 and a control unit 102.

The detection unit 100 detects concentration of an active material or an impurity contained in the gas (exhaust gas 12) discharged through the exhaust gas channel 70. The gas as the detection target may be a gas in the exhaust gas channel 70, or may be a gas forcibly discharged by the exhaust apparatus 64.

The control unit 102 at least controls the intake port opening/closing unit 96, the exhaust apparatus 64, and the exhaust fan 20 of the exhaust treatment apparatus 10. During normal operation, an opening signal is outputted to the intake port opening/closing unit 96 to thereby place the intake port 94 in the open state at all times.

Therefore, during normal operation, as shown in FIGS. 5 to 7, by operation of the exhaust apparatus 64, the pressure on the back side of each of the casings 78 is decreased below the pressure on the front side of the casing 78, and placed in a negative pressure state. In this state, air flows into the casing 78 through the intake port 94, and the air then flows toward the opening 98. The air flows from the front surface portion along the upper surface portion of each module battery 88, and then flows through the opening 98 into the exhaust gas channel 70. After the air flows into the exhaust gas channel 70, the air moves toward the exhaust apparatus 64, and the air is discharged to the outside through the exhaust port 74. By continuously operating the exhaust apparatus 64, intake and discharge operations of the air are performed continuously.

Further, when concentration of the active material detected by the detection unit 100 has a predetermined value or more, the control unit 102 outputs a closing signal to the intake port opening/closing unit 96, and outputs an operation stop signal to the exhaust apparatus 64 to thereby place the intake port 94 in the closed state and stop operation of the exhaust apparatus 64. When operation of the exhaust apparatus 64 is stopped, the exhaust port 74 is placed in the closed state as well by the wind pressure type shutter 76. Therefore, it is possible to prevent the gas containing active material (exhaust gas 12) from being discharged to the outside directly.

Further, the control unit 102 operates the exhaust fan 20 of the exhaust treatment apparatus 10. Therefore, as shown in FIG. 9, by operation of the exhaust fan 20, the exhaust gas 12 present in the first package 54A, the second package 54B, the exhaust gas channel 70, etc. is guided toward the exhaust treatment apparatus 10 through the communication hole 68 of the container apparatus 50, and the exhaust gas 12 is sent from the inlet port 14 to the outlet port 16 of the exhaust treatment apparatus 10. The exhaust gas 12 passes through the chemical filters 22 provided in between the inlet port 14 and the outlet port 16. Therefore, concentration of the target component in the exhaust gas 12 is reduced. Consequently, the purified exhaust gas 12a is discharged to the outside from the outlet port 16 of the exhaust treatment apparatus 10.

In the container apparatus 50 according to the embodiment of the present invention, when an abnormality occurs in the gas concentration in the event of a fire, etc. of the module battery 88, the intake port 94 and the exhaust port 74 of the container apparatus 50 are closed. Therefore, the high concentration exhaust gas 12 containing active material does not leak out. However, since the container apparatus 50 is filled with the exhaust gas 12, at the time of opening the container apparatus 50 for subsequently handling the accident, the handling of the accident may not be performed smoothly due to the high concentration exhaust gas. However, the container apparatus 50 according to the embodiment of the present invention is equipped with the exhaust treatment apparatus 10. Therefore, the high concentration exhaust gas 12 produced in a fire, etc. is sent from the inlet port 14 to the outlet port 16 by operation of the exhaust fan 20 of the exhaust treatment apparatus 10. Since the exhaust gas 12 flows through the chemical filter 22 between the inlet port 14 and the outlet port 16, concentration of the target component is reduced. Consequently, the purified exhaust gas 12a is discharged from the outlet port 16 of the exhaust treatment apparatus 10. Therefore, the accident can be handled promptly. Further, since no liquid is used, no flow channel for such liquid is required. Accordingly, size reduction of the container apparatus 50 where the exhaust treatment apparatus 10 is provided in combination with the first package 54A and the second package 54B is achieved, and management and maintenance operations can be carried out easily.

Further, in the embodiment of the present invention, the exhaust apparatus 64 is provided at the upper position of the control chamber 62 provided adjacent to the exhaust gas channel 70, and the control device 66 having the detection unit 100 and the control unit 102 is provided at the lower position of the control chamber 62. Therefore, the space which otherwise would have been considered as a dead space in the control chamber 62 can be utilized for installation of the exhaust apparatus 64, and effective utilization of installation space is achieved. Accordingly, it becomes possible to suppress increase in the size.

In the above examples, the exhaust treatment apparatus 10 is provided at the corner of the control chamber 62 adjacent to the first package 54A. Alternatively, the exhaust treatment apparatus 10 may be provided at the corner of the control chamber 62 adjacent to the second package 54B. Alternatively, the exhaust treatment apparatus 10 may be provided at the side closing plate 58 opposite to the control chamber 62, in a portion communicating with the exhaust gas channel 70. That is, the exhaust treatment apparatus 10 may be provided at any portion as long as the portion communicates with the exhaust gas channel 70.

Further, in consideration of the case where a blackout occurs due to a fire, etc., preferably, an auxiliary power source should be provided. In the event of a blackout, using the auxiliary power source, the control device 66, the exhaust apparatus 64, and the exhaust treatment apparatus 10 are energized, and thus it is possible to purify the exhaust gas.

In the above example, although a case has been described in which the container apparatus 50 according to the present invention is utilized for the package 54 formed by stacking a large number of module batteries 88 in stages, the container apparatus 50 can be suitably applied to a container, a warehouse, etc. containing a large number of objects to be kept at a certain temperature.

It is a matter of course that the exhaust treatment apparatus and the container apparatus according to the present invention are not limited to the embodiments described above, and various structures can be adopted without deviating from the scope of the present invention.

What is claimed is:

1. An exhaust treatment apparatus comprising:
a casing having a first chamber with an inlet port provided at a lower portion of the first chamber and configured to allow an exhaust gas to flow into the casing, a second chamber with an outlet port provided at a lower portion of the second chamber and configured to allow a purified exhaust gas to be discharged from the casing, and a partition plate as a partition between the first chamber and the second chamber;
a communication hole provided at an upper position of the partition plate and configured to communicate the first chamber with the second chamber;
an exhaust fan provided at an upper position of the first chamber, the exhaust fan being configured to send the exhaust gas from the inlet port of the first chamber to the second chamber through the communication hole; and
a chemical filter provided in at least one stage in a flow path between the communication hole in the partition plate and the outlet port of the second chamber, wherein
a pre-filter in at least one stage is provided in a flow path between the inlet port of the first chamber and the exhaust fan, the pre-filter having a pressure loss higher than that of the chemical filter.

2. The exhaust treatment apparatus according to claim 1, wherein the pre-filter is arranged in an oblique direction relative to flow direction of the exhaust gas.

3. The exhaust treatment apparatus according to claim 1, wherein at least one first pre-filter is provided in a preceding stage of the chemical filter, the first pre-filter having a pressure loss higher than that of the chemical filter; and
a second pre-filter is provided between the chemical filter and the first pre-filter, the second pre-filter having a pressure loss higher than that of the chemical filter and lower than that of the first pre-filter.

4. The exhaust treatment apparatus according to claim 1, wherein the chemical filter comprises chemical filters in two or more stages, and
among the chemical filters, adjacent chemical filters are provided in different orientations.

5. A container apparatus comprising a package having a container space surrounded by at least a roof, a front plate, and a side plate, and a content housed in the container space of the package,
the container apparatus further having:
an intake port and an exhaust port provided in the package;
a shutter mechanism configured to close the intake port and the exhaust port when an abnormality occurs in the content and thereby confine the exhaust gas; and
an exhaust treatment apparatus provided in combination with the package,
wherein the exhaust treatment apparatus includes:
a casing having a first chamber with an inlet port provided at a lower portion of the first chamber and configured to allow an exhaust gas to flow into the casing, a second chamber with an outlet port provided at a lower portion of the second chamber and configured to allow a purified exhaust gas to be discharged from the casing, and a partition plate as a partition between the first chamber and the second chamber;
a communication hole provided at an upper position of the partition plate and configured to communicate the first chamber with the second chamber;
an exhaust fan provided at an upper position of the first chamber, the exhaust fan being configured to send the exhaust gas from the inlet port of the first chamber to the second chamber through the communication hole; and
chemical filters provided in two or more stages in a flow path between the communication hole in the partition plate and the outlet port of the second chamber, wherein
a pre-filter in at least one stage is provided in a flow path between the inlet port of the first chamber and the exhaust fan, the pre-filter having a pressure loss higher than that of the chemical filter.

* * * * *